United States Patent [19]

Eixenberger

[11] 3,996,422
[45] Dec. 7, 1976

[54] MULTIPLE CHANNEL DECOMMUTATOR ACCUMULATOR

[75] Inventor: Charles A. Eixenberger, Post Falls, Idaho

[73] Assignee: The United States of America as represented by the Secretary of the Navy, Washington, D.C.

[22] Filed: Oct. 22, 1975

[21] Appl. No.: 625,360

[52] U.S. Cl. .............................. 179/15 A; 179/2 A; 179/7 R; 340/178
[51] Int. Cl.² .................... H04M 15/00; H04J 3/04
[58] Field of Search ............ 179/15 A, 7 R, 7 MM, 179/7.1 R, 7.1 TP, 15 BY, 2 A, 2 AS; 340/178, 183, 150, 152, 168

[56] References Cited
UNITED STATES PATENTS

| | | | |
|---|---|---|---|
| 3,697,695 | 10/1972 | Pommerening | 179/7 MM |
| 3,742,142 | 6/1973 | Martin | 179/2 AM |
| 3,790,713 | 2/1974 | Neufang | 179/15 AT |
| 3,842,206 | 10/1974 | Barsellotti | 179/2 AM |
| 3,920,911 | 11/1975 | Lukas | 179/7 MM |

*Primary Examiner*—David L. Stewart
*Attorney, Agent, or Firm*—Richard S. Sciascia; Joseph M. St.Amand; William W. Cochran, II

[57] ABSTRACT

A multiple channel decommutator accumulator for decommutating a multiplexed encoded signal forming a train of serial pulses on a single input line to form a series of parallel channels wherein the pulses are accumulated. A display device is provided for addressing any one of the series of channels for continuously displaying the signal accumulated by the channel.

3 Claims, 3 Drawing Figures

Fig. 1a. INCOMING SIGNAL
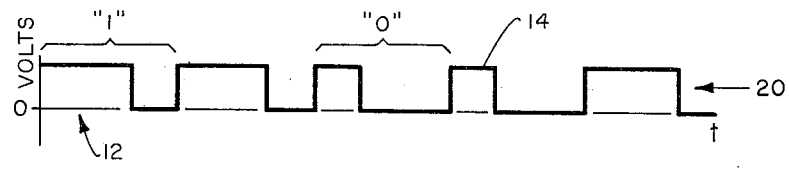
Fig. 1b. CLOCK SIGNAL
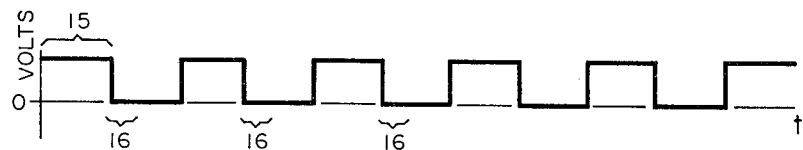
Fig. 2.
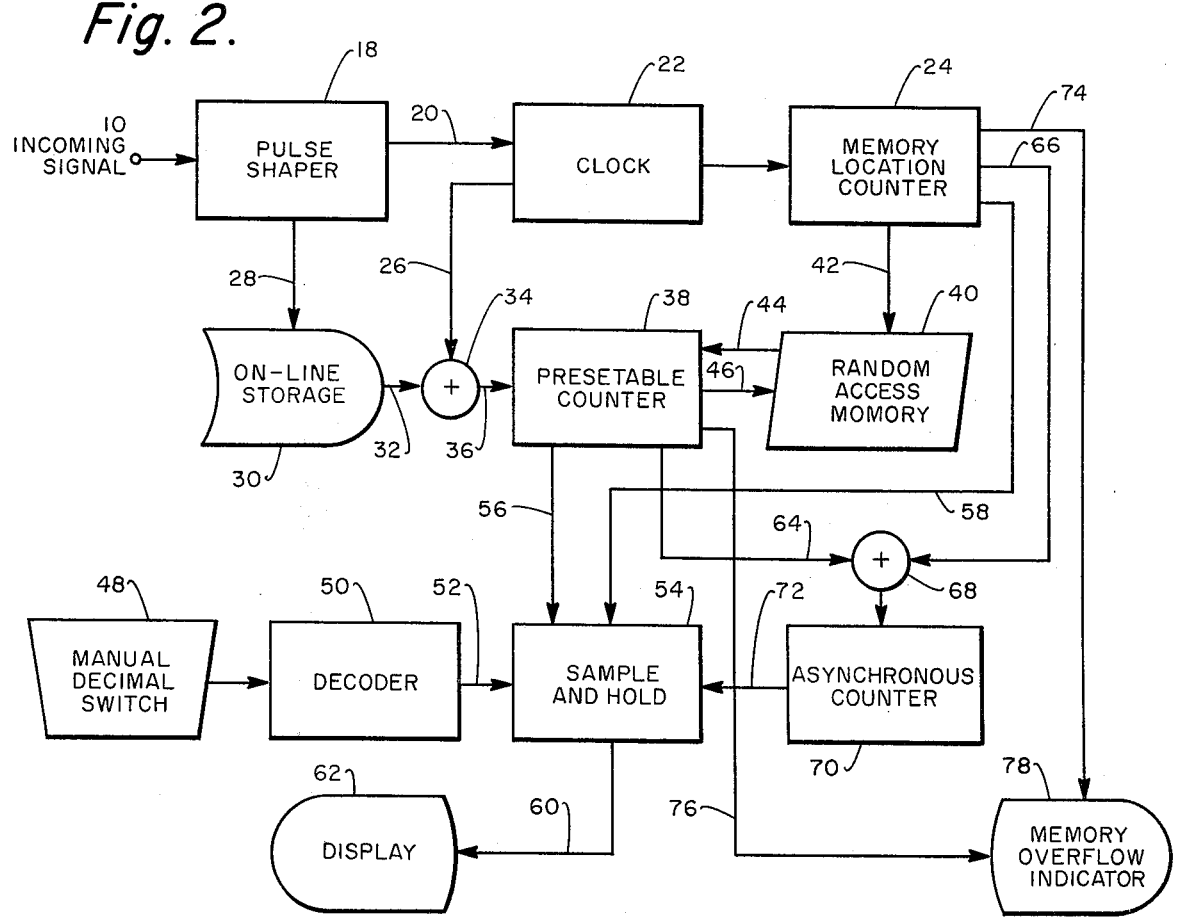

MULTIPLE CHANNEL DECOMMUTATOR ACCUMULATOR

BACKGROUND OF THE INVENTION

The present invention pertains generally to decommutators and more specifically to a decommutator for accumulating pulse inputs in a series of parallel channels such that the output of any one of the channels can be addressed by a single display device. Conventional methods of decommutation generally utilize the process of simply reversing the multiplexing system. Therefore, to decommutate any predetermined number of signals, the decommutator is required to switch to that predetermined number of different outputs when a multiplicity of signals have been multiplexed into a single input signal. This requires a multiplicity of separate outputs to properly decommutate the signals. Conventional decommutators therefore require a multiplicity of counters and displays to accumulate pulses in any particular channel for display. In most instances, it is not necessary to observe all of the channels at once. The duplication of output displays and counters, although required in the conventional decommutator, is therefore many times an excessive and unnecessary expense required in its construction.

SUMMARY OF THE INVENTION

The present invention overcomes the disadvantages and limitations of the prior art devices by providing an improved multiple channel decommutator accumulator. The decommutator accumulator of the present invention utilizes a random access memory to sequentially store data in address locations provided by a memory location counter. Any preselected channel of pulses is accumulated in a presettable counter for display on a single display device.

It is therefore an object of the present invention to provide an improved multiple channel decommutator accumulator. It is also an object of the present invention to provide a multiple channel decommutator accumulator which is inexpensive to construct.

Another object of the present invention is to provide a multiple channel decommutator accumulator which will display any one of the multiplicity of channels on a single display device.

Other objects and further scope of applicability of the present invention will become apparent from the detailed description given hereinafter.

The detailed description indicating the preferred embodiments of the invention is given only by way of illustration since various changes and modifications within the spirit and scope of the invention will become apparent to those skilled in the art from the detailed description. The foregoing abstract of the disclosure is for the purpose of providing a non-legal brief statement to serve as a searching scanning tool for scientists, engineers and researchers and is not intended to limit the scope of the invention as disclosed herein, nor is it intended that it should be used in interpreting or in any way limiting the scope or fair meaning of the appended claims.

BRIEF DESCRIPTION OF THE DRAWINGS

FIG. 1a is a plot of the magnitude in volts of the incoming signal versus time.

FIG. 1b is a plot of the magnitude in volts of the self-generated clock signal versus time.

FIG. 2 is a block diagram of the preferred embodiment of the invention.

DETAILED DESCRIPTION OF THE PREFERRED EMBODIMENT

FIG. 1a is a plot of a typical train of serial data pulses which have been commutatively encoded from a series of data output channels. As shown in FIG. 1a, the incoming signal is also multiplexed such that a logical "one" is shown as a long pulse 12, and a logical "zero" is shown as a short pulse 14.

FIG. 1b is a plot of the output of the self-generated clock. The series of clock pulses shown in FIG. 1b have a duration 15 which is less than the duration of the pulse 12 indicating a logical "one" and longer than pulse 14 indicating a logical "zero". As such, the incoming signal can be multiplexed by investigating the magnitude of the incoming signal 10 during the time period 16, as shown in FIG. 1b.

FIG. 2 is a block diagram of the preferred embodiment of the invention. The incoming signal 10 is processed in pulse shaper 18 to form a discrete digital signal, as shown in FIG. 1a. The pulse shaper uses a simple RC network to eliminate noise from the incoming signal and an Schmitt trigger to provide a jitter-free input to clock 22 and on-line storage circuit 30. The clock 22 consists of a one-shot multivibrator which is triggered on the rising edge of the incoming signal 20 and produces a pulse having a duration 15, as shown in FIG. 1b. The output of the clock is applied to a memory location counter 24 that increments on every clock pulse to provide an output signal representative of the total number of clock pulses produced within a predetermined period. The output of the pulse shaper 18 is also applied to an on-line storage circuit 30 via connector 28. On-line storage circuit 30 comprises a digital delay circuit such as a shift register wherein the data stored in the on-line storage circuit 30 is serially shifted out along output 32. The data is then demultiplexed in logical circuit 34 such that a pulse is produced on output 36 for each logical "one". These pulses are then accumulated in presettable counter 38. Simultaneously, the output of memory location counter 24 is producing a memory address signal 42 which is progressively incremented due to the pulses from clock 22. The memory address signal 42 functions to sequentially address memory locations within the random access memory 40. As each memory address location is addressed in seriatim, a data channel output signal 44 is produced which represents the data stored in each of the memory locations within the random access memory 40. Each of these memory locations is representative of a data channel forming the plurality of data channels from which the train of serial data pulses is produced at the incoming signal 10. The memory output signal 44 is applied to the presettable counter 38. Once the data from random access memory 40 is stored in presettable counter 38, the on-line storage value constituting signal 36 is added to the presettable counter 38 producing an accumulated data channel signal 46 which is stored in the random access memory 40 in the same storage position that the memory output signal was produced. This cumulative memory storage signal 46 stored in the random access memory 40 for each of the plurality of the data channels is therefore an accumulation of the data pulses for each data channel on the incoming signal 10 for a number of data pulse trains.

To provide greater flexibility in the counter circuitry of the preferred embodiment, asynchronous counter 70 is also provided to count overflow pulses. The incrementing memory adjust signal is applied along line 66 while overflow pulses from presettable counter 38 are applied to line 64. Logic circuitry 68 gates the overflow pulses into the asynchronous counter 70 so that the range of the presettable counter 38 can be extended. Each time this occurs, a signal is also produced along line 76 and applied to memory overflow indicator 78. The memory overflow indicator can be preset to show overflows only on certain preselected channels within a presettable counter 38 such that if an overflow occurs on any other channel which is accumulated within the asynchronous counters 70, the memory overflow indicator 78 will not display an overflow count.

The preferred embodiment of the invention, as shown in the block diagram of FIG. 2, also provides a means for displaying the accumulated data channel signal for any one of the plurality data channels. A manual decimal switch 48 produces a signal indicating the particular channel desired to be displayed. This signal is decoded in decoder 50 to produce any address signal 52 which is held within the sample and hold circuit 54. The data address signal 52 is then compared within the sample and hold circuit 54 with the memory address location from memory location counter 24 supplied to the sample and hold circuit via line 58. When the signals match, the accumulated data channel signal stored in the presettable counter 38 is sampled and held by sample and hold circuit 54. The accumulated data channel signal is then supplied to the display circuit 62 along line 60 where it is held ad continuously updated by sample and hold circuit 54. The display device 62 displays this cumulative memory storage signal for the preselected channel until the manual decimal switch 48 is reset for display of another channel.

The device of the preferred embodiment of the present invention is therefore able to decommutate, and demultiplex an incoming signal and accumulate the number of data pulses for a multiplicity of input data channels. Additionally, this system can display the number of accumulated data pulses for any one preselected channel on a single display device. This reduces the cost in the duplication of display devices by the number of channels in the incoming signal. Since all the input channels use the same counters, latches and displays, there is no increase in cost and size for adding more channels to the system. The only cost encountered would be to increase the size of the random access memories if the signal to be decommutated is larger than the storage space of the random access memory. Furthermore, the system uses the self-generated clock which allows it to decommutate the range of pulse widths from 100 microseconds to 10 milliseconds.

Obviously many modifications and variations of the present invention are possible in light of the above teachings. For example, the circuit can also be adapted for use with pulse code modulation by providing an external clock running at the frequency of the PCM signal to trigger the system. In addition, the size of the counters used could also be increased to accumulate pulses for any number of data train signals. It is therefore to be understood that within the scope of the appended claims the invention may be practiced otherwise than as specifically described.

What is claimed is:

1. A multiple channel decommutator accumulator comprising:
   a. clock means for producing a series of clock pulses;
   b. first counter means connected to said clock means for producing a memory address signal representative of said clock pulses counted by said first counter means;
   c. storage means for producing a memory output signal in response to said memory address signal;
   d. second counter means for adding said memory output signal to produce a cumulative memory storage signal for storage in said storage means;
   e. means for sampling and holding said cumulative memory storage signal for display; and,
   f. an asynchronous counter for counting overflow pulses from said second counter.

2. A multiple channel decommutator accumulator comprising:
   a. clock means for producing a series of clock pulses;
   b. first counter means connected to said clock means for producing a memory address signal representative of said clock pulses counted by said first counter means;
   c. storage means for producing a memory output signal in response to said memory address signal;
   d. second counter means for adding said memory output signal to produce a cumulative memory storage signal for storage in said storage means;
   e. means for sampling and holding said cumulative memory storage signal for display; and,
   f. memory overflow indication means connected to said first counter and said second counter for resetting said second counter to zero whenever said first counter reaches a predetermined count.

3. A device for decommutating a train of serial data pulses to form a plurality of data channels and accumulating pulses within said data channels comprising:
   a. clock means for producing a series of clock pulses;
   b. first counter means connected to said clock means for producing a series of memory address signals corresponding to memory locations of said plurality of data channels;
   c. memory means responsive to said series of memory address signals for producing a data channel output signal for each of said memory locations in said memory means addressed by said first counter means;
   d. second counter means for adding said data channel output signal from each of said memory locations in said memory means to data pulses for corresponding channels in said train of serial data pulses to form a series of accumulated data channel signals for storage in said memory means;
   e. a single display means for selectively displaying data from any one of said accumulated data channel signals; and,
   f. memory overflow indication means connected to said first counter and said second counter for resetting said second counter to zero whenever said first counter reaches a predetermined count.

* * * * *